(12) United States Patent
Koga (10) Patent No.: US 7,660,653 B2
(45) Date of Patent: Feb. 9, 2010

(54) CAR NAVIGATION SYSTEM (75) Inventor: Yasutaka Koga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/545,292

(22) PCT Filed: Oct. 27, 2004

(86) PCT No.: PCT/JP2004/015939

§ 371 (c)(1),
(2), (4) Date: Aug. 11, 2005

(87) PCT Pub. No.: WO2005/061992

PCT Pub. Date: Jul. 7, 2005

(65) Prior Publication Data

US 2006/0136120 A1      Jun. 22, 2006

(30) Foreign Application Priority Data

Dec. 19, 2003  (JP) .............................. 2003-423013

(51) Int. Cl.
G06F 19/00    (2006.01)
(52) U.S. Cl. ........................... 701/36; 701/200; 701/35; 701/29; 340/439; 340/576
(58) Field of Classification Search ......... 701/200–214, 701/36, 29, 35; 340/988, 426, 139, 576; 342/457
See application file for complete search history.

(56) References Cited

U.S. PATENT DOCUMENTS 6,028,537 A  *  2/2000  Suman et al. ................ 340/988
6,304,817 B1     10/2001 Troedel
6,385,542 B1     5/2002  Millington
2003/0191585 A1  10/2003 Sakamoto et al.

FOREIGN PATENT DOCUMENTS

| DE | 198 54 399 A1 | 6/2000 |
| DE | 102 38 548 A1 | 6/2003 |
| EP | 0 582 081 A2 | 2/1994 |
| JP | 09-053948 B2 | 2/1997 |
| JP | 11-219500 A | 8/1999 |
| JP | 2000-266557 A | 9/2000 |
| JP | 2002-277274 A | 9/2002 |
| JP | 2003-121160 A | 4/2003 |
| JP | 2003-170790 A | 6/2003 |

* cited by examiner

Primary Examiner—Khoi H. Tran
Assistant Examiner—Ronnie Mancho
(74) Attorney, Agent, or Firm—Sughrue Mion, PLLC (57) ABSTRACT A car navigation system includes: a vehicle-information acquiring means 14 for acquiring the vehicle information held by a vehicle 2; a setting-information generating means 15, 16 for generating setting information to be set in a processing program 19 based on the vehicle information acquired by the vehicle-information acquiring means; a setting-information notification means 17 for notifying the setting information generated by the setting-information generating means 15, 16 to the processing program 19; and a setting-information switching means 18, included in the processing program 19, for switching the internal setting state of the processing program 19 according to the setting information given by the setting-information notification means, wherein the processing program 19 performs a navigation function in the setting state switched by the setting-information switching means 18.

8 Claims, 6 Drawing Sheets

CUSTOMER SET VALUE LIST

| CUSTOMER | SET VALUE |
|---|---|
| A | C |
| B | D |
| ⋮ | ⋮ |

CAR NAVIGATION SYSTEM

TECHNICAL FIELD

The present invention relates to a car navigation system, and more particularly to a technology used for enabling a single car navigation system to be compatible with plural customers' standards.

BACKGROUND ART

Conventionally, a navigation device mounted on a vehicle has been known. The manufacturer of such a navigation device produces the hardware and programs therefor tailored to the specifications of individual customers (or dealers), who are automakers or car dealers, for example, and supplies the devices to the customers because the specifications of the navigation device vary from customer to customer. Therefore, even if the devices are of the same type, the map data and programs thereof may not be shared when the customer is different.

For this reason, a navigation device that can share a navigation system by selecting and exchanging the CD-ROMs used in various types of systems is developed (for example, see Patent Reference 1). This navigation device stores navigation processing programs, map information used for route search and route guidance, and other route information, which are compatible with various types of systems, in its CD-ROM, and its central processor retrieves the program supporting its own type of system from the CD-ROM, and reads the program into its program memory to start up the system, thus performing the navigation function. Accordingly, when plural types of systems share the CD-ROM, a navigation service freed from the system type can be provided.

Patent Reference 1: JP-A-09-053948

The conventional navigation device mentioned above is arranged such that a plurality of programs, which are compatible with the systems, respectively, are stored in a CD-ROM, and each of the systems acquires the program supporting its own type of system from the CD-ROM, and executes the program. Accordingly, the conventional navigation device can perform the navigation function adaptable to the device. However, the device cannot perform the navigation function suitable for an vehicle on which the navigation device is mounted, and for an environment in which the vehicle is used.

Moreover, the aforementioned conventional navigation device can be also arranged such that all the customers use the same type of hardware, for example, and the programs are provided for each of the customers, and are stored in a CD-ROM. However, it is necessary to store programs corresponding to the number of customers in the CD-ROM. When the number of customers increases, the quantity of data of the programs becomes enormous. Therefore, there develops a problem that the programs cannot be stored in the CD-ROM.

The present invention has been accomplished to solve the above-mentioned problem. An object of the present invention is to provide a navigation system that can perform navigation suitable for the vehicle and the use environment in which the vehicle is used by use of a small quantity of data.

DISCLOSURE OF THE INVENTION

The car navigation system according to the present invention is a car navigation system provided with a processing program for performing a navigation function, in order to attain the above-mentioned object, and the system is arranged to include: a vehicle-information acquiring means for acquiring the vehicle information held by a vehicle; a setting-information generating means for generating setting information to be set in the processing program based on the vehicle information acquired by the vehicle-information acquiring means; a setting-information notification means for notifying the setting information generated by the setting-information generating means to the processing program; and a setting-information switching means, included in the processing program, for switching the setting state in the processing program according to the setting information sent by the setting-information notification means, wherein the processing program executes the processing that performs a navigation function in the setting state switched by the setting-information switching means.

In this way, the navigation function is performed by switching the setting of the processing program based on the vehicle information held by the vehicle. As a result, the navigation suitable for the vehicle and the use environments in which the vehicle is used can be performed. Moreover, the setting state of the processing program is changed according to the vehicle information, thereby enabling the navigation with reference to the vehicle information to be performed. This eliminates the need for the car navigation system to have a plurality of programs compatible with plural types of systems, respectively, and enables the system to perform the navigation function by use of a single program. Therefore, the problem that the quantity of data becomes enormous as the number of the programs increases can be overcome.

BEST MODE FOR CARRYING OUT THE INVENTION

An embodiment of the present invention will now be described with reference to the drawings in order to explain the present invention in further detail.

Embodiment 1

Figure 1:
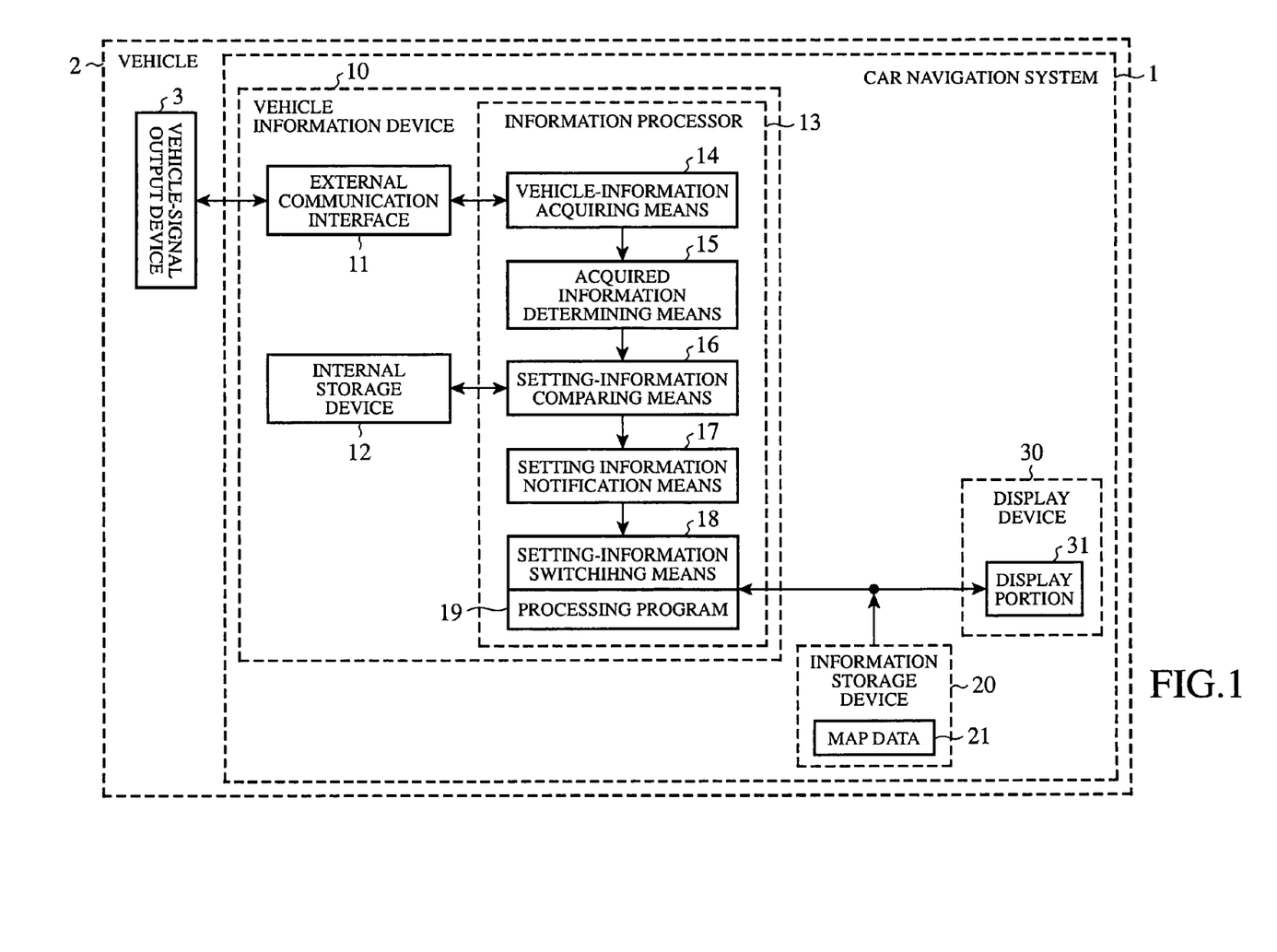
FIG. 1 is a block diagram illustrating the configuration of a car navigation system in accordance with Embodiment 1 of the present invention.

FIG. 1 is a block diagram illustrating the configuration of a car or vehicle navigation system in accordance with Embodiment 1 of the present invention. This car navigation system 1 is mounted on a vehicle 2 for use. The vehicle 2 is provided with a vehicle-signal output device 3. The car navigation system 1 and the vehicle-signal output device 3 are connected by a vehicle-mounted LAN (Local Area Network). The vehicle-mounted LAN can be configured by use of a MOST (Media Oriented Systems Transport) bus, a CAN (Controller Area Network) bus, a serial bus, infrared rays, and Bluetooth. The vehicle-mounted LAN is further connected with information system units such as a vehicle audio device and an AV device, and system units for a body system, a safety system, and a power train (drive control) system, other than the above components.

The vehicle-signal output device 3 outputs vehicle information. This vehicle information has been previously set in the vehicle-signal output device 3 by a customer such as the manufacturer or dealer of the vehicle 2, for example. The vehicle information is constituted by including customer information representing the customer.

The car navigation system 1 is composed of a vehicle-mounted information device 10, an information storage device 20, and a display device 30. In addition, the vehicle-mounted information device 10 is composed of an external communication interface 11, an internal storage device 12, and an information processor 13.

The external communication interface 11 is an interface for which the car navigation system 1 communicates with the vehicle-signal output device 3. The external communication interface 11 receives the vehicle information from the vehicle-signal output device 3, and sends the information to the information processor 13. This external communication interface 11 is appropriately arranged to comply with communication standards adopted in the vehicle-mounted LAN, that is, MOST, CAN, serial, infrared rays, and Bluetooth, and so on.

The internal storage device 12 can be composed of a RAM (Random Access Memory), a ROM (Read Only Memory), and a HDD (Hard Disk Drive), for example. This internal storage device 12 stores the customer information included in the vehicle information received from the vehicle-signal output device 3. This internal storage device 12 is empty in the initial state just after the car navigation system 1 is installed in the vehicle 2.

The information processor 13 is performed by the program processing executed by a CPU (not shown). The information processor 13 is composed of a vehicle-information acquiring means 14, an acquired-information determining means 15, a setting-information comparing means 16, a setting-information notification means 17, a setting-information switching means 18, and a processing program 19. The setting-information generating means of the present invention is composed of the acquired-information determining means 15 and the setting-information comparing means 16.

The processing program 19 includes: a location processing program for performing a location function that detects the vehicle position; a map-display processing program for performing a map-display function that displays a map on the display device 30; a menu-display processing program for performing a menu-display function that displays a menu on the display device 30; an opening processing program for performing an opening function that displays a start-up screen on the display device 30; and a retrieval processing program for performing a retrieval function that selects data for retrieving an address and facilities. The processing program 19 performs an operation complying with the customer by installing setting information generated based on the customer information in the program.

The vehicle-information acquiring means 14 acquires the vehicle information from the vehicle-signal output device 3 through the external communication interface 11. The customer information included in the vehicle information acquired by this vehicle-information acquiring means 14 is sent to the acquired-information determining means 15.

The acquired-information determining means 15 determines whether the customer information sent from the vehicle-information acquiring means 14 is valid or invalid. This determination is made by examining whether or not the customer shown in the customer information exists in a customer-list table (not shown) provided in the information processor 13. The customer information judged to be valid by the acquired-information determining means 15 is sent to the setting-information comparing means 16. When the customer information is judged as being invalid by the acquired-information determining means 15, the information is not sent to the setting-information comparing means 16, but the information is processed by the information processor 13 in a predetermined way (described later in detail).

The setting-information comparing means 16 compares the customer information sent from the acquired-information determining means 15 with the customer information stored in the internal storage device 12. As a result compared by the setting-information comparing means 16, when the correspondence between these information is judged, the customer information is sent to the setting-information notification means 17. In contrast, when no correspondence therebetween is judged, the customer information is sent to the internal storage device 12, and stored therein.

The setting-information notification means 17 generates setting information based on any one of the customer information sent from the setting-information comparing means 16, the customer information stored in the internal storage means 12, and the initial value. The setting information generated by this setting-information notification means 17 is sent to the setting-information switching means 18.

The setting-information switching means 18 is provided in the processing program 19 using the setting information, specifically, in each of the location processing program, map-display processing program, menu-display processing program, opening processing program, and retrieval processing program. The setting-information switching means switches the internal setting state of the processing program 19 in order to correspond to the setting information of the notification received from the setting-information notification means 17. The processing program 19 having the internal setting state switched by this setting-information switching means 18 accesses the information storage device 20 and/or the display device 30, and executes the processing for performing a location function, map-display function, menu-display function, opening function, or retrieval function to comply with the customer.

The information storage device 20 is composed of a CD (Compact Disc), a DVD (Digital Versatile Disc), and a HDD (Hard Disc Drive), for example, and stores a map data 21, the processing program 19 (not shown), and other various data. The contents of this information storage device 20 are read out from the information processor 13.

The display device 30 is composed of a liquid crystal display device (LCD), for example, and has a display portion 31. The display portion 31 displays a map screen, menu screen, start-up screen, and retrieval screen, required by the customer, for example, according to the processing of the processing program 19 of the setting state switched by the setting-information switching means 18 of the information processor 13.

Figure 2:
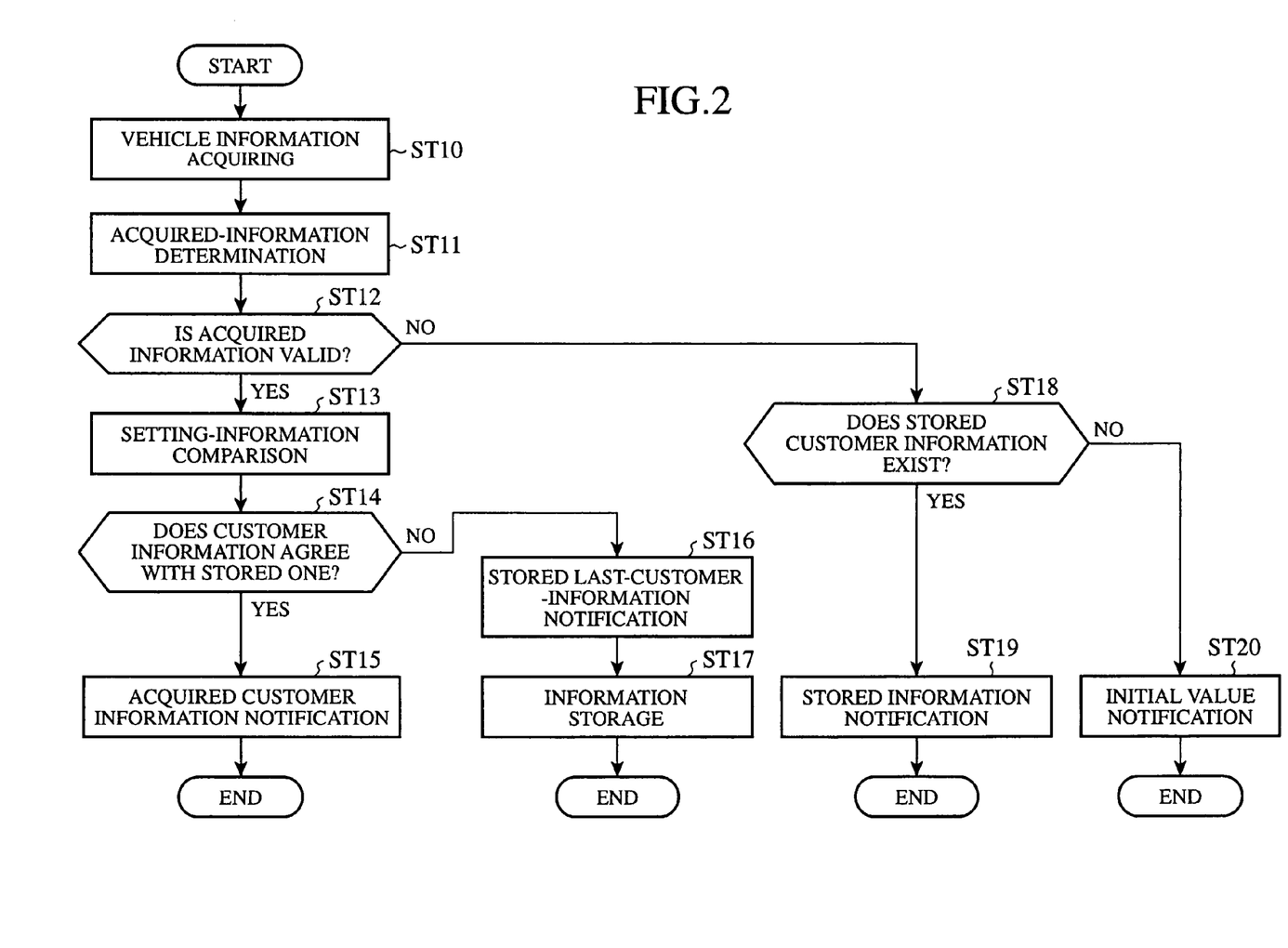
FIG. 2 is a flow chart for explaining the operation of the car navigation system in accordance with Embodiment 1 of the present invention.

The operation of the navigation system in accordance with Embodiment 1 of the present invention, which is arranged as described above, will now be explained by referring to the flow charts shown in FIGS. 2-5.

when power is also turned on at the car navigation system 1 accompanied by power-on of the vehicle 2, the vehicle information is first acquired (step ST10). To be specific, the vehicle-information acquiring means 14 of the information processor 13 acquires the vehicle information from the vehicle-signal output device 3 through the external communication interface 11. Then, a judgment about the acquired information (acquired vehicle information) is made (step ST11), and the acquired information is examined as to whether the information is valid or invalid (step ST12). That is, the acquired-information determining means 15 examines whether the customer information contained in the vehicle information acquired by the vehicle-information acquiring means 14 is valid or invalid.

In the step ST12, when the acquired information is judged to be valid, a setting-information comparison processing is subsequently performed (step ST13). This processing examines whether or not the customer information contained in the acquired information agrees with the customer information stored in the internal storage device 12 (step ST14). To be more specific, the setting-information comparing means 16 compares the customer information contained in the acquired information (vehicle information) sent from the acquired-information determining means 15 with the customer information stored in the internal storage device 12, and examines whether both of the customer information agree with each other.

In the step ST14, when agreement is judged, the acquired customer information is notified to the processing program 19 (step ST15). To be specific, the setting-information notification means 17 generates setting information based on the customer information contained in the acquired information (vehicle information), and notifies the setting-information switching means 18 included in the processing program 19 of the setting information.

In the above step ST14, when disagreement is judged, the last customer information stored in the internal storage device 12 is notified to the processing program 19 (step ST16). Specifically, the setting-information notification means 17 generates setting information based on the last customer information stored in the internal storage device 12, and notifies the setting-information switching means 18 included in the processing program 19 of the setting information. Thereafter, the customer information acquired this time is stored in the internal storage device 12 (step ST17). Therefore, the newly acquired customer information becomes valid when the power is supplied to the car navigation system 1 at the next time.

When the acquired information is judged as invalid in the above step ST12, the process then checks whether or not the customer information is present in the internal storage device 12 (step ST18). In this step, when presence of the information is judged, the customer information stored in the internal storage device 12 is notified to the processing program 19 (step ST19). Specifically, the setting-information notification means 17 generates setting information based on the customer information stored in the internal storage device 12, and notifies to the setting-information switching means 18 included in the processing program 19 of the setting information.

In the above step ST18, when no presence of the customer information is judged in the internal storage device 12, the initial value of the setting information is notified to the processing program 19 (step ST20). To be specific, the setting-information notification means 17 makes notification of the initial value of the setting information that is predetermined in the car navigation system 1 to the setting-information switching means 18 included in the processing program 19.

Receiving the notification of the setting information in the above steps ST15, ST16, ST19 and ST20, the setting-information switching means 18 switches the inner setting state of its own program to be adapted to the notified setting information. The processing program 19 of which the internal setting state is switched by the setting-information switching means 18 accesses the information storage device 20 and/or the display device 30, and executes the processing for performing the respective functions. The switching processing between these setting states is carried out based on any one of the following three patterns.

Figure 3:
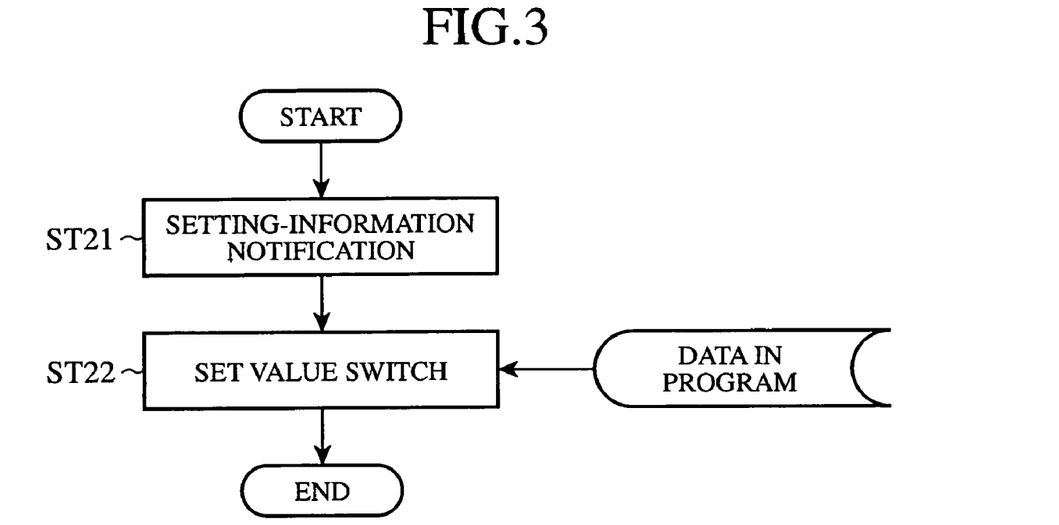
FIG. 3 is a diagram for explaining a first pattern of switching the setting state in the car navigation system in accordance with Embodiment 1 of the present invention.
Figure 6:
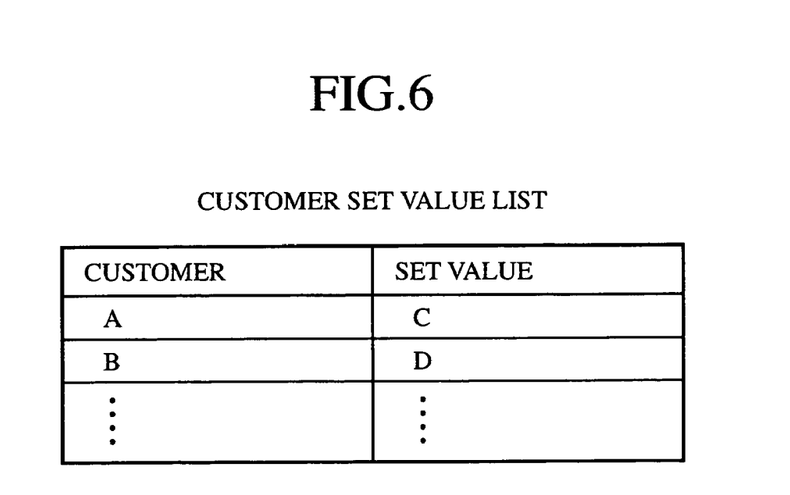
FIG. 6 is a diagram for explaining for a specific example of the first pattern of switching the setting state in the car navigation system in accordance with Embodiment 1 of the present invention.

In the first switching pattern of the setting state, when the setting information is notified as shown in FIG. 3 (step ST21), the set value is switched by simply replacing data stored in the program according to the setting information (step ST22). This first switching pattern of the setting state is employed by the location processing program 19 for performing the location function. In this case, the set values are held in the program for each of the customers as shown in FIG. 6, and the set value is replaced according to the customer information. For example, when customer information concerning a customer B as the vehicle information is received, the set value D is set in the location processing program. Thereby, locator information such as the circumference of a tire suiting the vehicle of the customer B, for example, is output.

Figure 4:
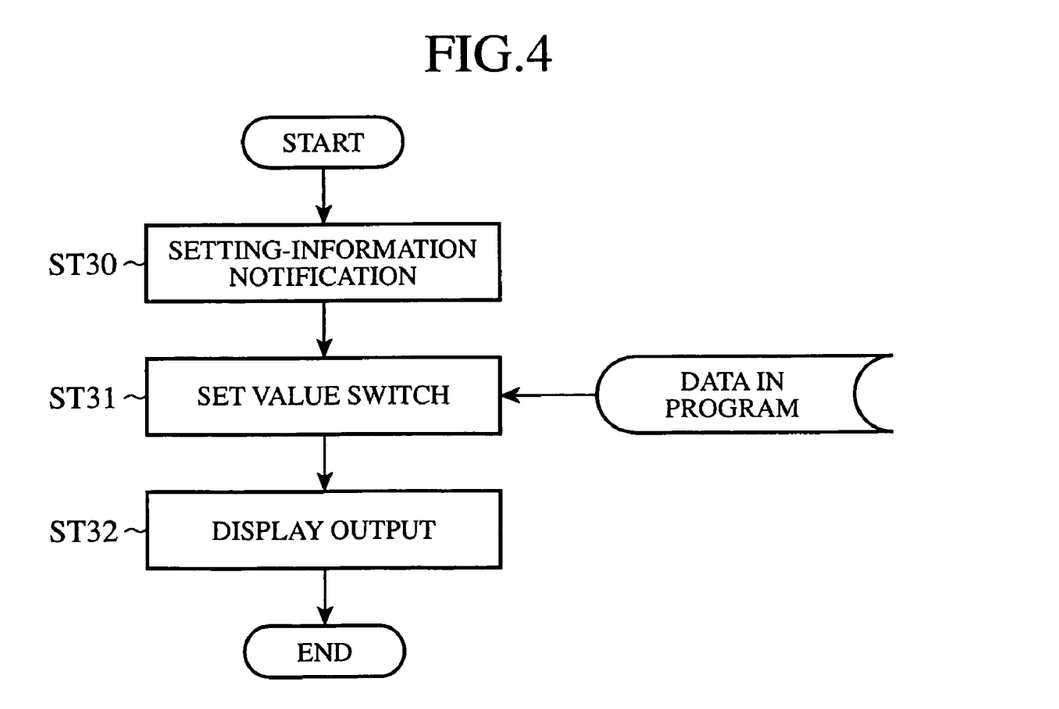
FIG. 4 is a diagram for explaining a second pattern of switching the setting state in the car navigation system in accordance with Embodiment 1 of the present invention.
Figure 7:
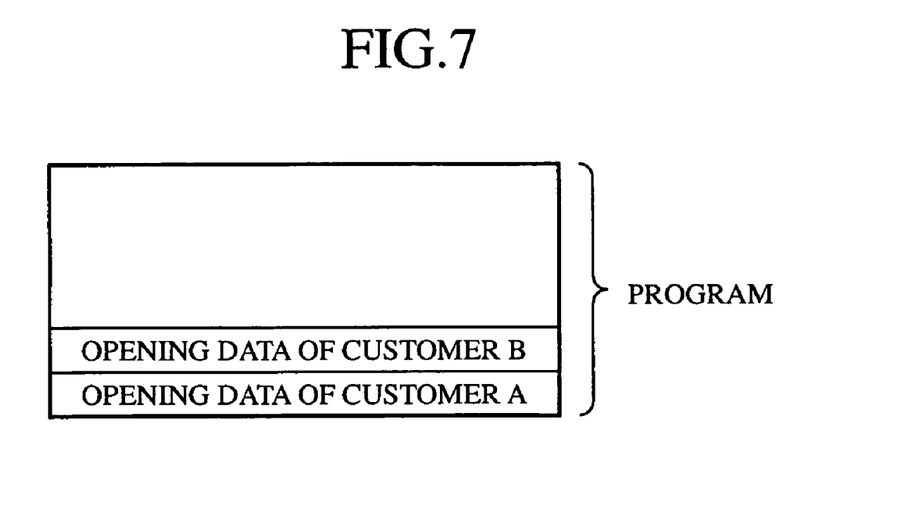
FIG. 7 is a diagram for explaining a specific example of the second pattern of switching the setting state in the car navigation system in accordance with Embodiment 1 of the present invention.

In the second switching pattern of the setting state, when the setting information is notified as shown in FIG. 4 (step ST30), the data held previously in the program is switched according to the setting information (step ST31), and the display suiting to the customer is outputted (step ST32). The second switching pattern of the setting state is employed by the opening processing program for performing the opening display function. In this case, the opening data stored previously in the program is read according to the customer information and displayed as shown in FIG. 7. For example, when the customer information concerning a customer A is received as the vehicle information, the opening data of the customer A, stored in the program is displayed. Thus, the start-up screen required by the customer A, for example, is displayed.

Figure 5:
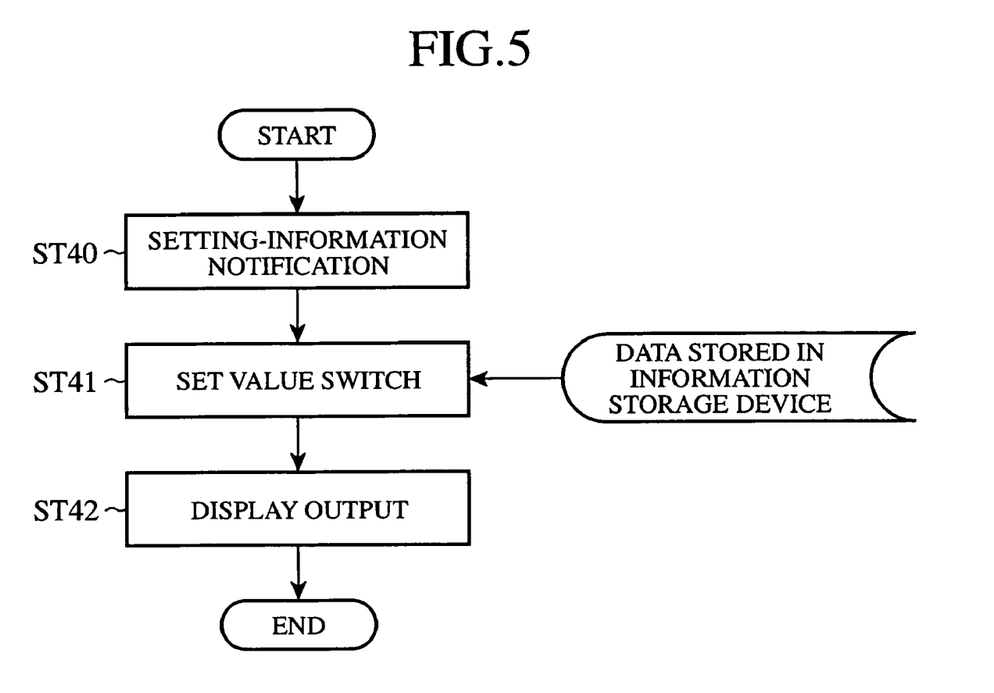
FIG. 5 is a diagram for explaining a third pattern of switching the setting state in the car navigation system in accordance with Embodiment 1 of the present invention.
Figure 8:
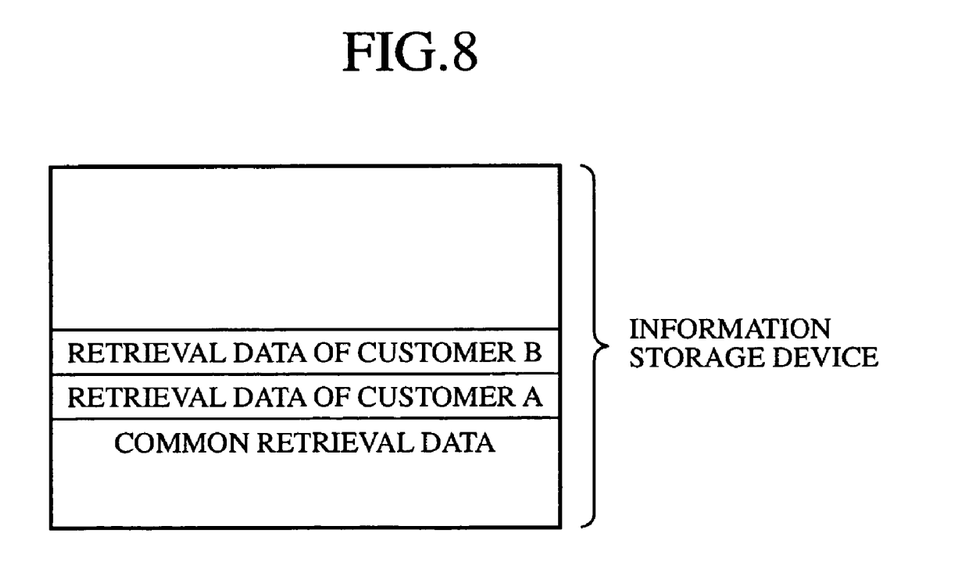
FIG. 8 is a diagram for explaining a specific example of the third pattern of switching the setting state in the car navigation system in accordance with Embodiment 1 of the present invention.

In the third switching pattern of the setting state, when the setting information is notified as shown in FIG. 5 (step ST40), the data stored in the information storage device 20 is read and switched according to the setting information (step ST41), and the display is outputted (step ST42). The third switching pattern of the setting state is employed chiefly by the menu-display processing program for performing the menu-display function, the map-display processing program for performing the map-display function, and the retrieval processing program for performing the retrieval function. In using the retrieval function, when the customer information concerning the customer A is received as the vehicle information, the retrieval data is switched such that the retrieval data of the customer A previously stored in the information storage device 20 is retrieved according to the setting information as shown to FIG. 8. Moreover, in a similar manner to the above, the customer-specific menu screen can be displayed when the menu-display function is used, and the customer's symbol can be displayed on the map when the map-display function is used.

As described above, according to the car navigation system of Embodiment 1 of the present invention, by using the vehicle information available from the external vehicle-signal output device 3, the functions complying with the specifications meeting the customers' requests can be performed in a single program, and the operations of plural types of systems can be carried out in the same hardware that is a common platform. Furthermore, because the programs can be consolidated into one, the volume of the recording medium of the map data storing the programs can be prevented from increasing, thereby enabling the data area necessary for the car navigation system to be secured. Further, the setting information (configuration) about the customer and so on can be also added by renewing the program, thereby also enabling the car navigation system to meet a variety of requirements of the customers after the release of the program.

Embodiment 2

In the car navigation system in accordance with Embodiment 2 of the present invention, regional information, linguistic information, and steering-wheel-position information are acquired as vehicle information. The regional information is the one concerning the shipped region, that is, the region where the vehicle is used. The linguistic information is the one concerning the language used to input and output information in the vehicle 2. The steering-wheel-position information is the information concerning the position of the steering wheel of the vehicle 2, that is, the information representing that the vehicle is a left-hand drive or right-hand drive one.

The configuration of the car navigation system in accordance with Embodiment 2 is the same as that of the car navigation system in accordance with Embodiment 1, shown in FIG. 1.

The operation of the car navigation system in accordance with Embodiment 2 of the present invention will now be described as below. The procedure of processing thereof is generally the same as that of Embodiment 1, shown in the flow chart of FIG. 2 except that the vehicle information thereof includes the regional information, linguistic information, and steering-wheel-position information. For that, the operation thereof will be explained without using the flow chart.

when power is also turned on at the car navigation system 1 accompanied by power-on of the vehicle 2, the vehicle-information acquiring means 14 first acquires vehicle information from the vehicle-signal output device 3 through the external communication interface 11. This vehicle information includes the above-described regional information, linguistic information, and steering-wheel-position information. Here, we shall assume that "the U.K." as the regional information, "English" as the linguistic information, and "left-hand drive" as the steering-wheel-position information are acquired, respectively. The vehicle information acquired by this vehicle-information acquiring means 14 is sent to the acquired-information determining means 15.

The acquired-information determining means 15 determines whether the vehicle information, which is sent from the vehicle-information acquiring means 14, that the regional information is "the U.K.," the linguistic information is "English," and the steering-wheel-position information is "left-hand drive," is valid or invalid. This judgment is made by determining whether or not "the U.K." as the regional information, "English" as the linguistic information, and "left-hand drive" as the steering-wheel-position information are registered in a not-shown table provided in the information processor 13. When being judged as valid by the acquired-information determining means 15, the vehicle information is sent to the setting-information comparing means 16. In contrast, when being judged as invalid by the acquired-information determining means 15, the information is not sent to the setting-information comparing means 16, but the information is processed as an initial value in a predetermined procedure by the information processor 13 according to the regional information, linguistic information, and steering-wheel-position information stored in the information processor 13. (The detailed descriptions thereabout are omitted.)

The setting-information comparing means 16 compares the vehicle information, that is, the individual pieces of information such as the regional information that the region is the U.K., the linguistic information that the language is English, and the steering-wheel-position information that the steering-wheel position is "left-hand drive," sent from the acquired-information determining means 15 with the information each corresponding thereto stored in the internal storage device 12. When being compared therewith by this setting-information comparing means 16, and judged to agree with the latter vehicle information, the regional information, linguistic information, and steering-wheel-position information are sent to the setting-information notification means 17. In contrast, when being judged not to agree therewith, the regional information, linguistic information, and steering-wheel-position information are sent to the internal storage device 12, and stored therein.

The setting-information notification means 17 generates setting information based on the regional information, the linguistic information, and the steering-wheel-position information sent from the setting-information comparing means 16. The setting information generated by this setting-information notification means 17 is sent to the setting-information switching means 18.

The setting-information switching means 18 switches, to the processing program 19 using the setting information, the internal setting state of the program such that the regional information is "the U.K.," the linguistic information is "English," the steering-wheel-position information is "left-hand drive." The processing program 19 the internal setting state of which is switched by this setting-information switching means 18 accesses the information storage device 20 and/or the display device 30, and executes the processing for performing the functions thereof.

Figure 9A:
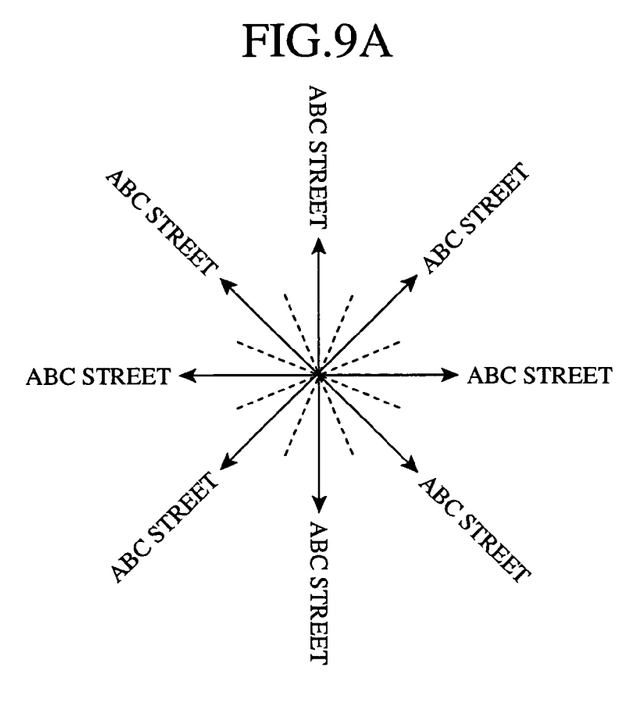
FIG. 9A and FIG. 9B are diagrams for explaining an example of displaying a map in a car navigation system in accordance with Embodiment 2 of the present invention.
Figure 9B:
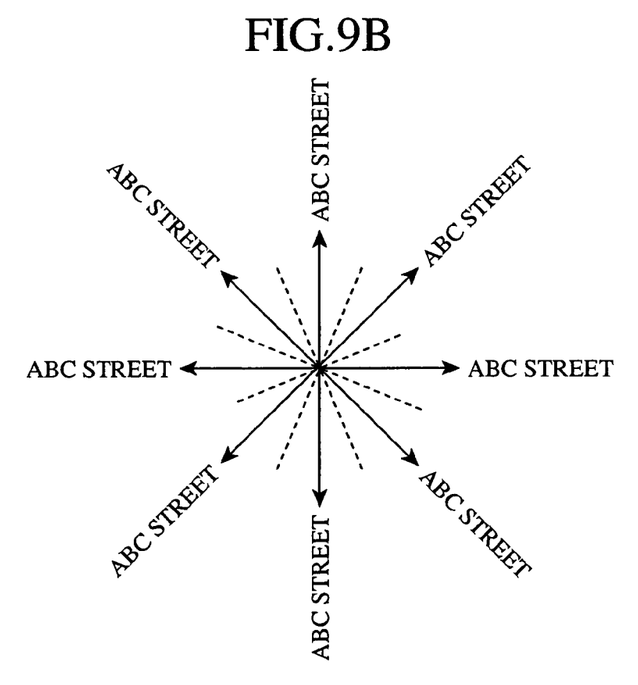

For example, in displaying a map in the display portion 31 of the display device 30, the map-display processing program causes English character strings showing the names of streets on the map to be rotated and displayed so that the names can be easily seen from the driver's seat on the left side as shown in FIG. 9A. In contrast, when the regional information about a right-hand-drive-specification, the linguistic information, and the steering-wheel-position information are acquired, the map-display processing program causes the character strings showing the names of streets on the map to be rotated and displayed so that the names can be easily seen from the driver's seat on the right side as shown in FIG. 9B.

As described above, according to the car navigation system of Embodiment 2 of the present invention, by using the vehicle information obtainable from the external vehicle-signal output device 3, the function of the navigation suiting to the region where the vehicle 2 is used, the language with which the vehicle is used, and the steering-wheel position of the vehicle 2 can be performed in a single program, and the operations of plural types of systems can be carried out in the same hardware that is a common platform.

INDUSTRIAL APPLICABILITY

As mentioned above, the car navigation system according to the present invention, does not need the provision of a plurality of programs matching plural types of systems, respectively, and is suitable for systems responding to plural customers' requests.

The invention claimed is:

1. A navigation system including a processing program for controlling functions of the navigation system, the navigation system configured to communicate with a vehicle on which the navigation system is mounted to obtain vehicle information identifying the vehicle, and configured to adjust the processing program in accordance with the vehicle information; the navigation system comprising:
    an information acquiring unit for acquiring the vehicle information transmitted from the vehicle via a vehicle-mounted LAN;
    an information determining unit for determining whether the vehicle information acquired by the information acquiring unit exists in an internal memory provided in the information determining unit;
    an information generating unit for generating, when the information determining unit determines that the vehicle information acquired by the information acquiring unit exists in the internal memory, setting-information of the processing program based on the vehicle information; and
    an adjusting unit for adjusting the processing program according to the setting-information generated by the information generating unit;
    wherein the navigation system operates under the processing program adjusted by the adjusting unit.

2. A navigation system according to claim 1, wherein the adjusting unit adjusts when the acquired information does not exist in the internal memory, the processing program according to predetermined setting-information.

3. A navigation system according to claim 1 further comprising:
    an information comparing unit for comparing the vehicle information with previously acquired vehicle information;
    wherein the information generating unit generates the setting-information based on the previously acquired vehicle information when the vehicle information acquired by the information acquiring unit is different from the previously acquired vehicle information.

4. A navigation system according to claim 1, wherein the vehicle information includes information of a dealer of vehicles or a manufacturer of vehicles, and the processing program controls the navigation system so as to display a logo of the dealer or the manufacture according to the information.

5. A navigation system according to claim 1, wherein the vehicle information includes information indicating a language used in a region in which the vehicle is used, and the processing program controls the navigation system so as to display information in the language indicated by the information.

6. A navigation system according to claim 1, wherein the vehicle information includes steering information indicating a steering-wheel position among left-hand drive and right-hand drive, and the processing program controls the navigation system to display information to a driver by rotating the displayed information according to the steering information.

7. A navigation system according to claim 1, wherein the vehicle information includes locator information, and the processing program includes a location detecting program which detects vehicle position based on locator information.

8. A navigation system according to claim 7, wherein the locator information comprises a circumference of a tire of the vehicle.

* * * * *